Jan. 24, 1967 E. R. MUCKELRATH 3,299,878
AIR AND WATER HEATER
Filed Dec. 30, 1965 3 Sheets-Sheet 3
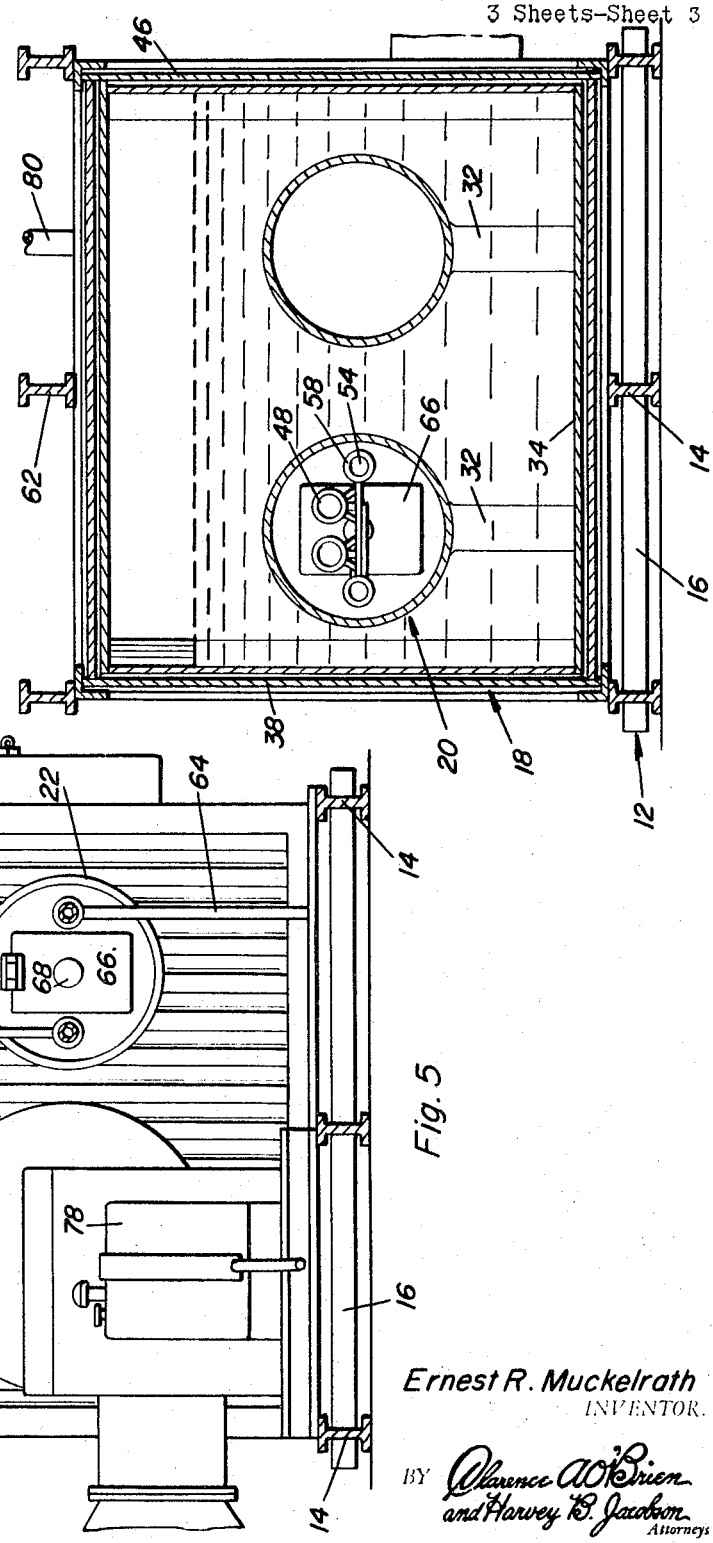
Ernest R. Muckelrath
INVENTOR.
BY Clarence A. O'Brien
and Harvey B. Jacobson
Attorneys 3,299,878
AIR AND WATER HEATER
Ernest R. Muckelrath, Tioga, N. Dak., assignor to Air Heaters, Inc., a corporation of North Dakota
Filed Dec. 30, 1965, Ser. No. 517,624
8 Claims. (Cl. 126—101)

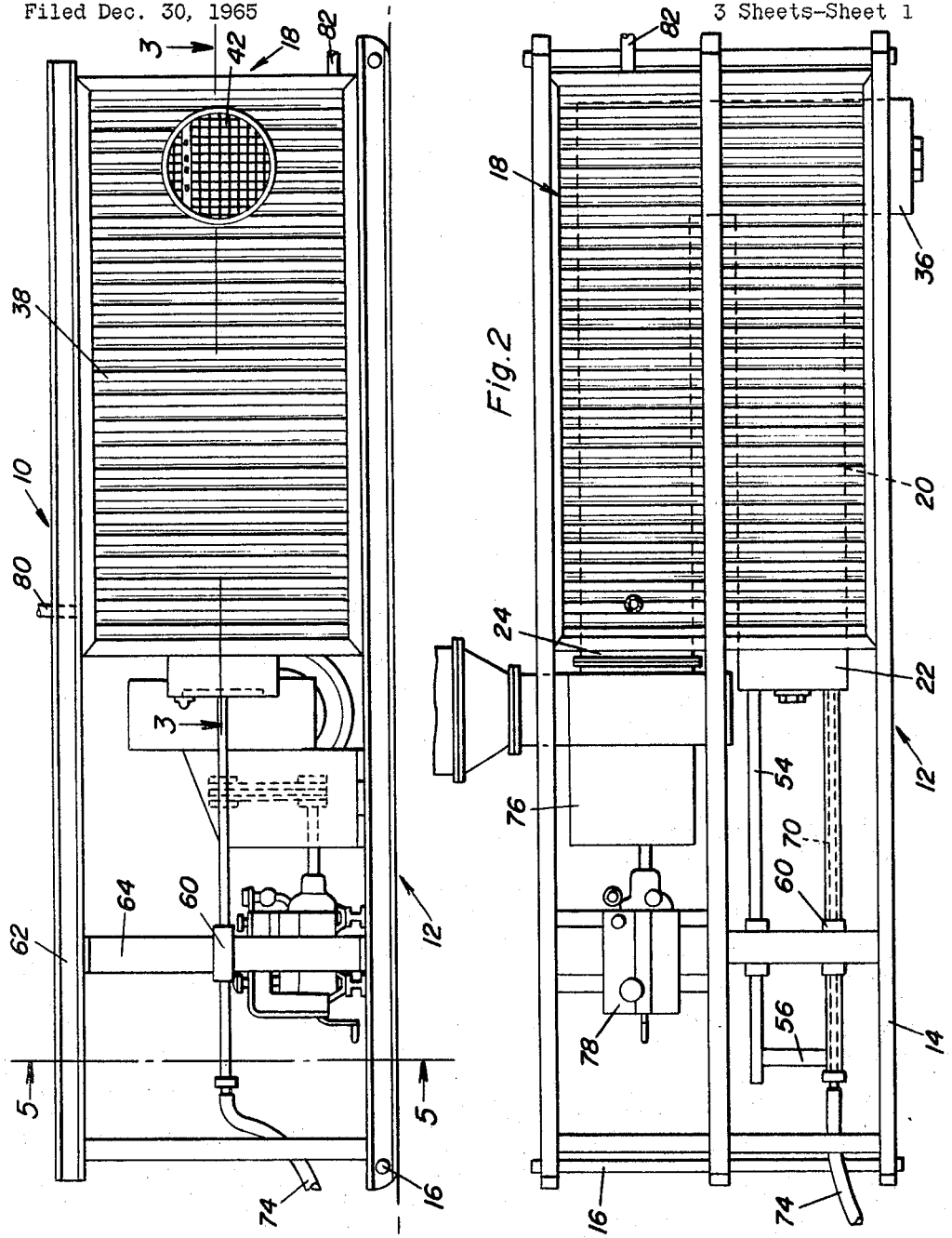

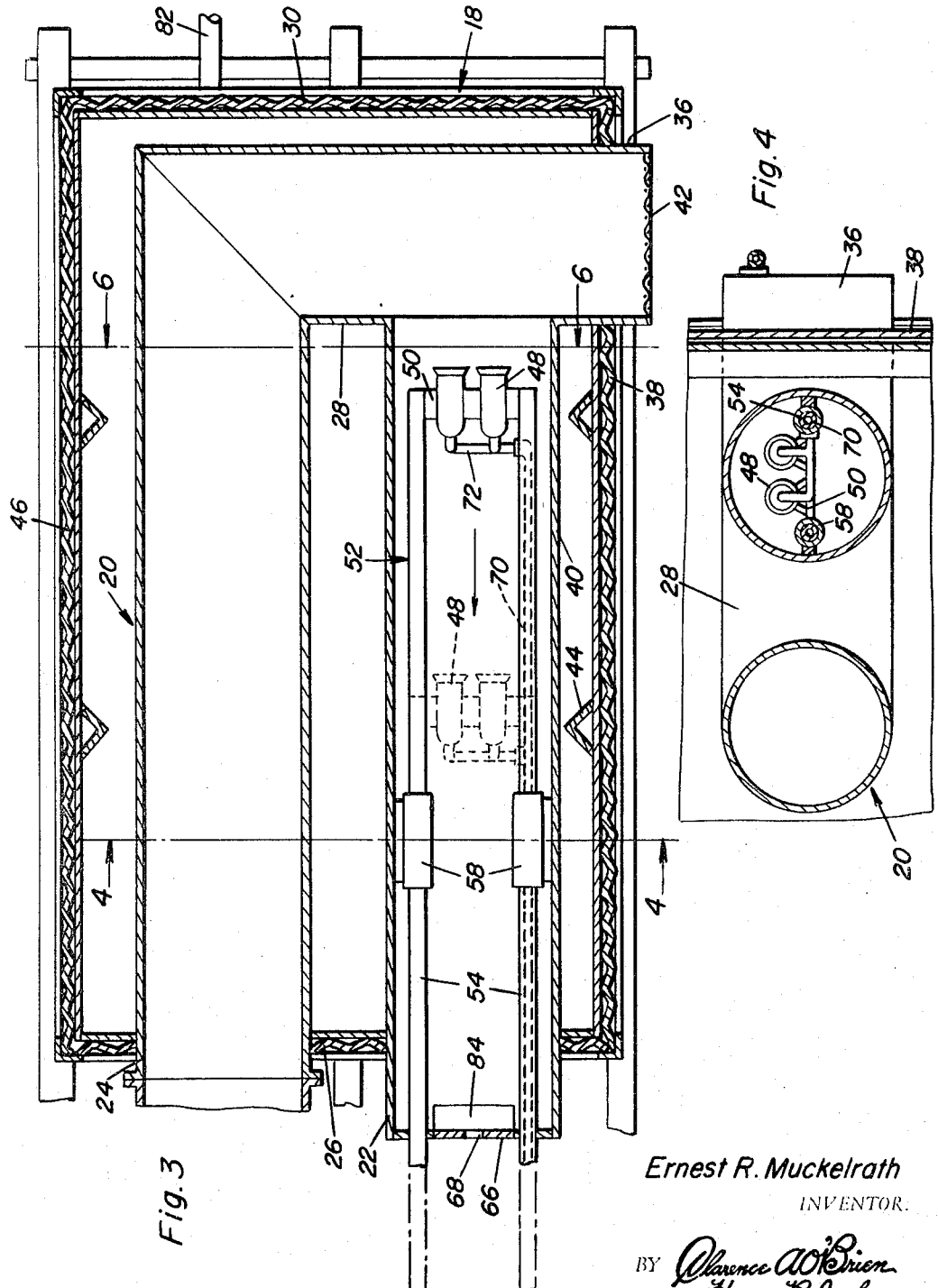

The instant application is a continuation-in-part of applicant's co-pending application for "Skid Mounted Heater," Serial No. 461,072, filed June 3, 1965, now Patent No. 3,263,979, issued August 2, 1966, and generally relates to a heater assembly adapted for providing both heated water and a substantial volume of discharging heated air.

It is a primary object of the instant invention to provide a portable heater which, in addition to being specifically adapted for heating large outdoor areas, such as about drilling rigs or the like, also provides for a large supply of heated water utilizing the same basic heating elements which produce the heated air.

Further, it is a highly significant object of the instant invention to provide a heater wherein the ratio between the heat introduced into the air and the heat introduced into the water can be varied as desired.

Also, it is considered an important object of the present invention to provide a combination air and water heater wherein a dependable and continuous supply of heater warmed air or warmed air and water can be insured in an economical manner and regardless of extremes in the ambient weather.

Furthermore, it is a significant object of the instant invention to provide for a heater unit wherein the burner heads themselves are completely concealed and capable of being externally manipulated so as to provide for the desired variances in the air and water heat.

In conjunction with the above object, it is also a significant object of the instant invention to provide means for insuring a complete combustion of the fuel.

Likewise, it is an object of the instant invention to provide a portable air and water heater which, in its entirety, is of a relatively simple and highly rugged nature capable of efficiently functioning notwithstanding any rough treatment to which it might be subjected when used adjacent outside work areas.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the combination air and water heater of the instant invention;

FIGURE 2 is a top plan view of the heater assembly;

FIGURE 3 is an enlarged horizontal cross-sectional view taken substantially on the plane passing along line 3—3 of FIGURE 1;

FIGURE 4 is an enlarged partial cross-sectional view taken substantially on a plane passing along line 4—4 in FIGURE 3;

FIGURE 5 is a cross-sectional view taken substantially on a plane passing along line 5—5 in FIGURE 1;

FIGURE 6 is a cross-sectional view taken substantially on a plane passing along line 6—6 of FIGURE 3.

Referring now more specifically to the drawings, reference numeral 10 is used to generally designate the portable combination air and water heater comprising the instant invention. The various operating elements of the heating assembly 10 are mounted upon an elongated bed 12, normally in the nature of a skid defined by three elongated laterally spaced parallel I-beams 14 interconnected by a plurality of transversely extending rigid pipes 16. As will be noted from the drawings, the opposite ends of the bed I-beams 14 are rounded so as to facilitate movement of the heater 10 over the various different terrains which will be encountered, with the front and rear transverse pipe braces 16, through the rounded surfaces thereof, further facilitating the movement of the unit.

Mounted on the skid bed 12 and extending the full width and approximately one-half the length thereof is an enlarged insulated water-tight housing 18. Mounted at approximately mid-height within the housing 18 is an elongated generally U-shaped heater tube 20 having the opposite ends 22 and 24 thereof projecting through and rigidly fixed, in a sealed manner, to the rear housing wall 26. The bight portion 28 of the heater tube 20 is located adjacent the forward housing wall 30, with the tube 20 itself being supported at spaced points therealong by suitable pedestals or legs 32 extending from the lower surface of the tube 20 to the bottom wall 34 of the housing.

Extending longitudinally from the bight portion 28 of the heater tube 20 toward the inlet side of the tube 20 is a relatively shorter tube section 36 which projects through and is sealed to the adjoining side housing wall 38. This tube section 36, which projects laterally from the first leg or section 40 of the tube 20 is of the same cross-sectional area as the remainder of the tube 20 which in turn has a constant cross-sectional area throughout the entire length thereof. It will be noted that the outer end of the shorter tube section 36 is provided with a hingedly mounted screen panel 42 so as to provide a protective screen for the air intake defined by this portion 36. Inasmuch as the housing 18 is to contain water, it has been deemed desirable to increase the rigidity thereof through vertically extending angle braces 44 fixed to the inner surface of the housing side walls 38 and 46.

The fire producing burner heads 48, two normally being provided, are mounted, through a transverse mounting platform 50, on an adjustable burner frame 52 which in turn comprises a pair of elongated rod-like side rails 54. These rails 54 are interconnected in spaced parallel relation to each other by the burner head mounting platform 50 at the forward ends thereof located within the first leg 40 of the burner tube 20, and similarly interconnected by a second transversely extending platform or brace 56 adjacent the rear end thereof located rearwardly of the housing 18 in spaced relation thereto. The frame rod-like rails 54 are slidably received through a first pair of elongated opposed sleeves 58 fixed to opposite sides of the first leg 40 of the tube 20 at apprximately mid-height therein, and a second pair of opposed sleeves 60 located rearwardly of the housing 18 and supported between the skid bed 12 and overhead super-structure 62 by means of vertical post-like members 64. The orientation of the rail supporting sleeves 58 and 60 and the length of the rails 54 themselves are such so as to enable a substantial longitudinal adjustment of the burner heads 58 within the first tube leg 40, somewhat as illustrated in FIGURE 3, with the longitudinal adjustment of the burner heads 48 being effected from the rear of the housing 18 through a physical manipulation of the frame 52.

The frame rails 54 extend through the closed end of the first tube leg 40 which in turn is provided with a pivotally mounted closure plate 66 having a hole 68 therein which functions as an observation port and an inlet for primary combustion supporting air to the rear of the burner heads 48, the lateral tube extension 36 functioning so as to introduce secondary combustion supporting air downstream of the burner heads 48. The fuel, which may be natural gas, liquid petroleum gas, diesel fuel oil, etc., is to be introduced to the burner heads 48 through a conduit 70 extending through one of the frame rails 54 and communicated, through lateral branches 72, with the burner heads 48 on the inner end of the frame 52, and to a suitable source of supply through a hose 74 communicating with the conduit at the rear end of the frame 52.

The heated air is drawn through and expelled from the heater assembly 10 by means of any suitable blower unit 76 engaged with the outlet end 24 of the heater tube 20 and powered by a suitable power plant 78, both the blower 76 and power plant 78 being mounted upon the skid bed 12 and operative in much the same manner as described in applicant's copending application Serial No. 461,072 so as to effect a large volume discharge of heated air. It will of course be appreciated that suitable extension tubes can if so desired, be provided for use in conjunction with the blower 76. Further, inasmuch as the housing 18 is to be specifically constructed as a water container whereby a heating of a large volume of water will be effected in conjunction with the heating of the air, the water level normally being higher than the burner tube 20 as illustrated in FIGURE 6, suitable pipes 80 and 82 are to be provided both for introducing the water and for withdrawing the water subsequent to the heating thereof.

In operation, the housing 18, assuming water is to be heated in addition to air, has a supply of water introduced thereinto, normally to a level above the top of the burner tube 20. Next, the frame 52 is adjusted so as to position the burner heads 48 at the location deemed most desirable so as to obtain the proper heating of both the air and the water. In other words, the closer the burner heads 48 are to the secondary air intake defined by the lateral tube section 36, the greater will be the heat transferred to the air being expelled through the blower and the heat transferred to the water within the housing will be proportionally reduced. By the same token, by moving the burner heads 48 rearwardly away from the secondary air intake, the transfer of the heat thereof to the blower discharged air will be reduced along with a corresponding increase in the heat being transferred to the water. Upon proper positioning of the burner heads 48, which incidentally may be adjusted during the operation of the device, the blower 76 is actuated and air is drawn through the tube 20 and subsequently discharged towards the area to be heated. Air is drawn in through both the opening 68 and the extension section 36 with the air through the opening 68 constituting the primary combustion supporting air. With regard to the primary combustion supporting air, it should be appreciated that the supply thereof can be augmented by an additional opening 84 through the intake end 22 of the tube 20 which extends rearwardly of the housing 18. The relatively restricted nature of these primary air openings enables the efficient operation of the blower at various speeds without adversely affecting the operation of the burner heads 48 and the initial combustion, while the secondary combustion supporting air, introduced through the extension duct 36 forward of the burner heads 48, insures a complete combustion of the gases within the duct, thereby eliminating excessive exhaust fumes being expelled from the blower toward the area to be heated. When water is contained within the housing 18 for the heating thereof, it will be appreciated that this heated or warmed water will also provide additional insulation for the burner tube 20 itself so as to tend to augment and maintain the heat generated therein. Incidentally, it will be noted that the air intake tube extension 36 is on the opposite side of the assembly 10 from the blower outlet, thereby providing for a safe venting of any leakage gas or the like, when the device is not being operated, away from the work area serviced by the assembly 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A heater assembly comprising an elongated heat-conveying duct means, said duct means including a first inlet end, a second outlet end, a primary air intake formed in said duct means at the first inlet end, a secondary air intake to said duct formed between the inlet end and the outlet in substantial spaced relation to both, blower means mounted adjacent the duct means outlet end and communicated therewith for drawing heated air from the duct means, fuel injection means disposed within said duct means between the inlet end and the secondary air intake, and means mounting said fuel injection means for longitudinal adjustment within said duct means between the inlet end and the secondary air intake.

2. The heater assembly of claim 1 wherein said mounting means for the fuel injection means comprises a mounting frame slidably supported within the duct means and projecting outwardly therefrom for selective adjustment from the exterior of the duct means.

3. The heater assembly of claim 2 wherein said duct means includes a sharp angular bend therein between the secondary air intake and the outlet end, said duct means having substantially the same cross-sectional area on both sides of said bend.

4. The heater assembly of claim 3 including an enlarged housing enclosing and forming a chamber about substantially the entire duct means between the inlet and outlet ends thereof, said secondary air intake being communicated directly with the exterior of said housing.

5. The heater assembly of claim 1 including an enlarged water-tight housing enclosing and forming a water chamber about substantially the entire duct means between the inlet and outlet ends thereof, said secondary air intake being in water excluding communication with the exterior of said housing, and means for providing for the introduction and removal of water from the chamber defined by the housing.

6. A heater assembly comprising an elongated heat-conveying duct means, said duct means including a first inlet end, a second outlet end, a primary air intake formed in said duct means at the first inlet end, blower means mounted adjacent the duct means outlet end and communicated therewith for drawing heated air from the duct means, an enlarged water-tight housing enclosing and forming a water chamber about substantially the entire duct means between the inlet and outlet ends thereof, means for introducing and removing water from said chamber, fuel injection means disposed in said duct means inward of the inlet end thereof, a secondary air intake communicating said duct means with the exterior of said housing in a water-tight manner, said secondary air intake being located between the inlet and the outlet ends of said duct means in spaced relation to both, said secondary air intake providing for a substantially greater introduction of air than said primary air intake, and means mounting said fuel injection means for selectively varying the position of the fuel injection means between the inlet end and the secondary air intake, said mounting means being accessible exteriorly of said housing and adjustable therefrom.

7. The heater assembly of claim 6 wherein the mounting means for the fuel injection means comprises a pair of elongated parallel rails projecting longitudinally into the duct means through the inlet end thereof, sleeve means supporting said rails both interiorly of and exteriorly of said duct means, and means mounting said fuel injection means on the inner ends of said rails whereby a longitudinal adjustment of the exteriorly accessible ends of said rails will effect a simultaneous adjustment of the location of the fuel injection means.

8. The heater assembly of claim 7 including an angular bend within said duct means between the secondary air intake and the outlet end, said duct means having a substantially constant cross-sectional area throughout the full length thereof.

References Cited by the Examiner

UNITED STATES PATENTS

| | | | |
|---|---|---|---|
| 1,832,786 | 11/1931 | Pattison | 158—42.2 |
| 2,151,512 | 3/1939 | Hagen | 110—147 X |
| 2,223,597 | 12/1940 | Brewster | 263—19 X |
| 2,495,673 | 1/1950 | Erwin | 126—360 |

JAMES W. WESTHAVER, *Primary Examiner.*